(12) United States Patent
Wegner et al.

(10) Patent No.: US 6,908,150 B1
(45) Date of Patent: Jun. 21, 2005

(54) SEAT FOR ATTACHMENT TO A VEHICLE HITCH OR SPORT UTILITY RACK

(76) Inventors: Wesley Gene Wegner, 3486 Robin Hill St., Thousand Oaks, CA (US) 91360-6226; Alan Conrad Holly, P.O. Box 1591, Mammoth Lakes, CA (US) 93546-1591

( * ) Notice: Subject to any disclaimer, the term of this patent is extended or adjusted under 35 U.S.C. 154(b) by 0 days.

(21) Appl. No.: 10/264,401

(22) Filed: Oct. 4, 2002

Related U.S. Application Data
(60) Provisional application No. 60/380,239, filed on May 13, 2002.

(51) Int. Cl.[7] .............................................. B60N 2/00
(52) U.S. Cl. .................. 297/217.1; 108/44; 297/463.2; 224/521
(58) Field of Search .......................... 297/217.1, 463.2; 108/44; 224/518–521

(56) References Cited

U.S. PATENT DOCUMENTS

| | | | |
|---|---|---|---|
| 5,197,381 A | 3/1993 | Mells | |
| 5,224,636 A * | 7/1993 | Bounds | 224/510 |
| 5,397,147 A * | 3/1995 | Ducharme et al. | 224/521 |
| 5,462,334 A | 10/1995 | Sedorcek et al. | |
| 5,570,826 A * | 11/1996 | Garbes et al. | 224/524 |
| 5,640,949 A * | 6/1997 | Smith | 126/276 |
| 5,857,741 A | 1/1999 | Anderson | |
| D414,949 S | 10/1999 | Natale | |
| 5,971,464 A | 10/1999 | Davis et al. | |
| 6,095,059 A | 8/2000 | Riley | |
| 6,116,676 A | 9/2000 | Edwards | |
| 6,189,458 B1 * | 2/2001 | Rivera | 108/44 |
| 6,269,578 B1 | 8/2001 | Callegari | |
| 6,314,891 B1 | 11/2001 | Larson | |
| 6,336,413 B1 * | 1/2002 | Ball | 108/44 |
| 6,467,417 B1 * | 10/2002 | Guyot et al. | 108/44 |
| 6,511,088 B2 * | 1/2003 | Kahlstorf | 224/521 |
| 6,662,983 B2 * | 12/2003 | Lane et al. | 108/44 |

* cited by examiner

*Primary Examiner*—Peter R. Brown
(74) *Attorney, Agent, or Firm*—Michael Blaine Brooks, P.C.; Michael B. Brooks; Andrew S. Naglestad

(57) ABSTRACT

Disclosed is a utility seat that attaches directly to a receiver hitch or indirectly by way of a sport utility rack, such as a bike or ski rack, thereby providing a stable means for sitting such that a sporting enthusiast may quickly and conveniently change sporting apparel and then collapse or fold up the seat toward the rear of the vehicle for storage and safe traveling.

7 Claims, 10 Drawing Sheets

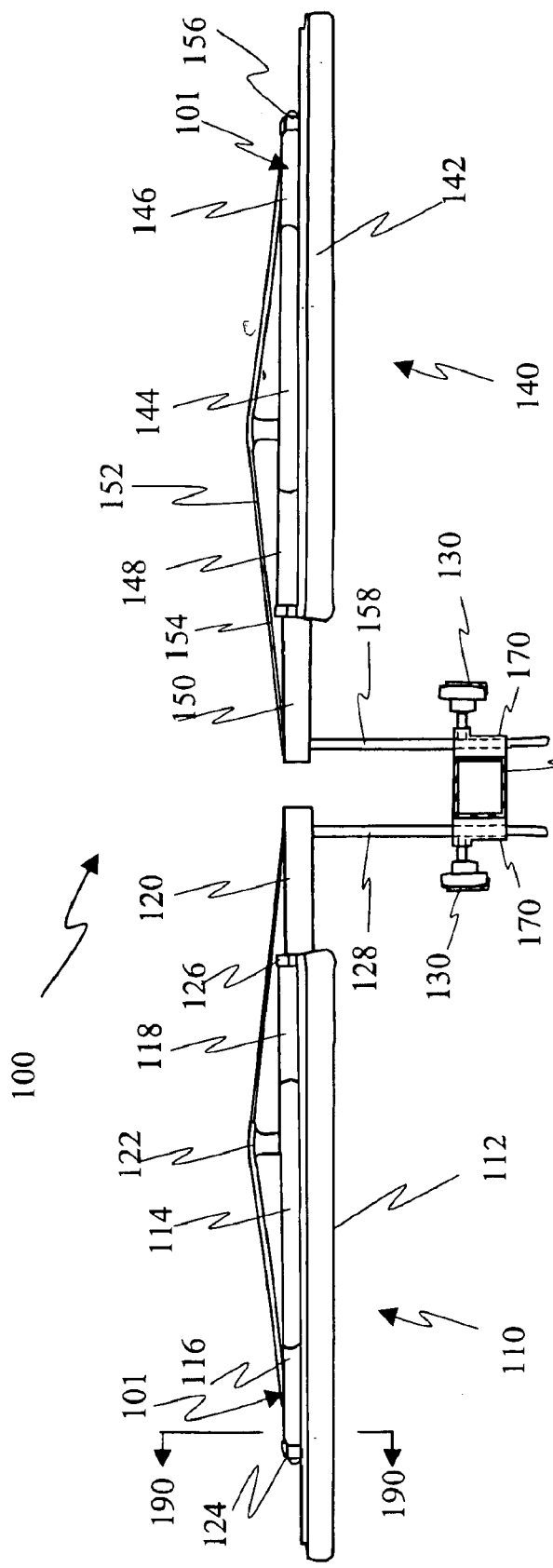

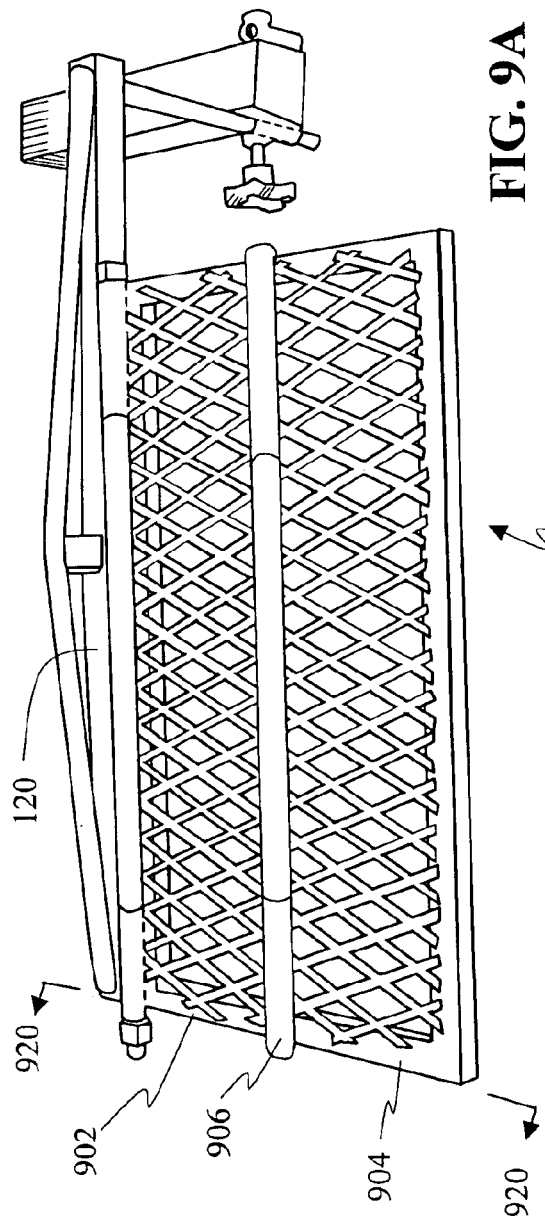
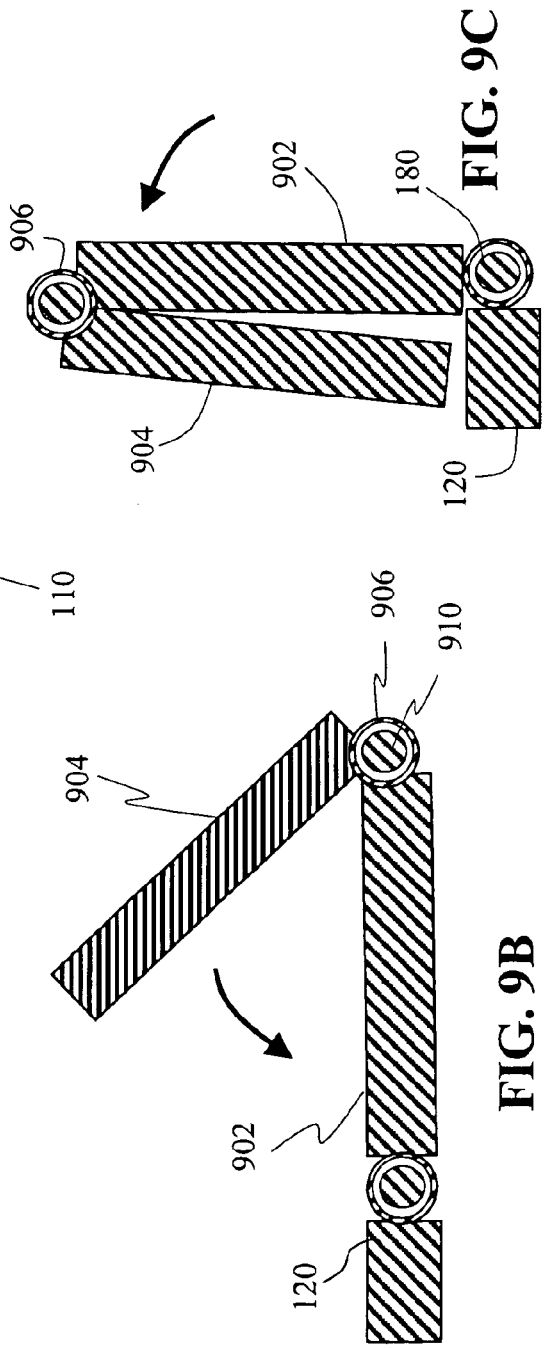
FIG. 9A
FIG. 9B
FIG. 9C

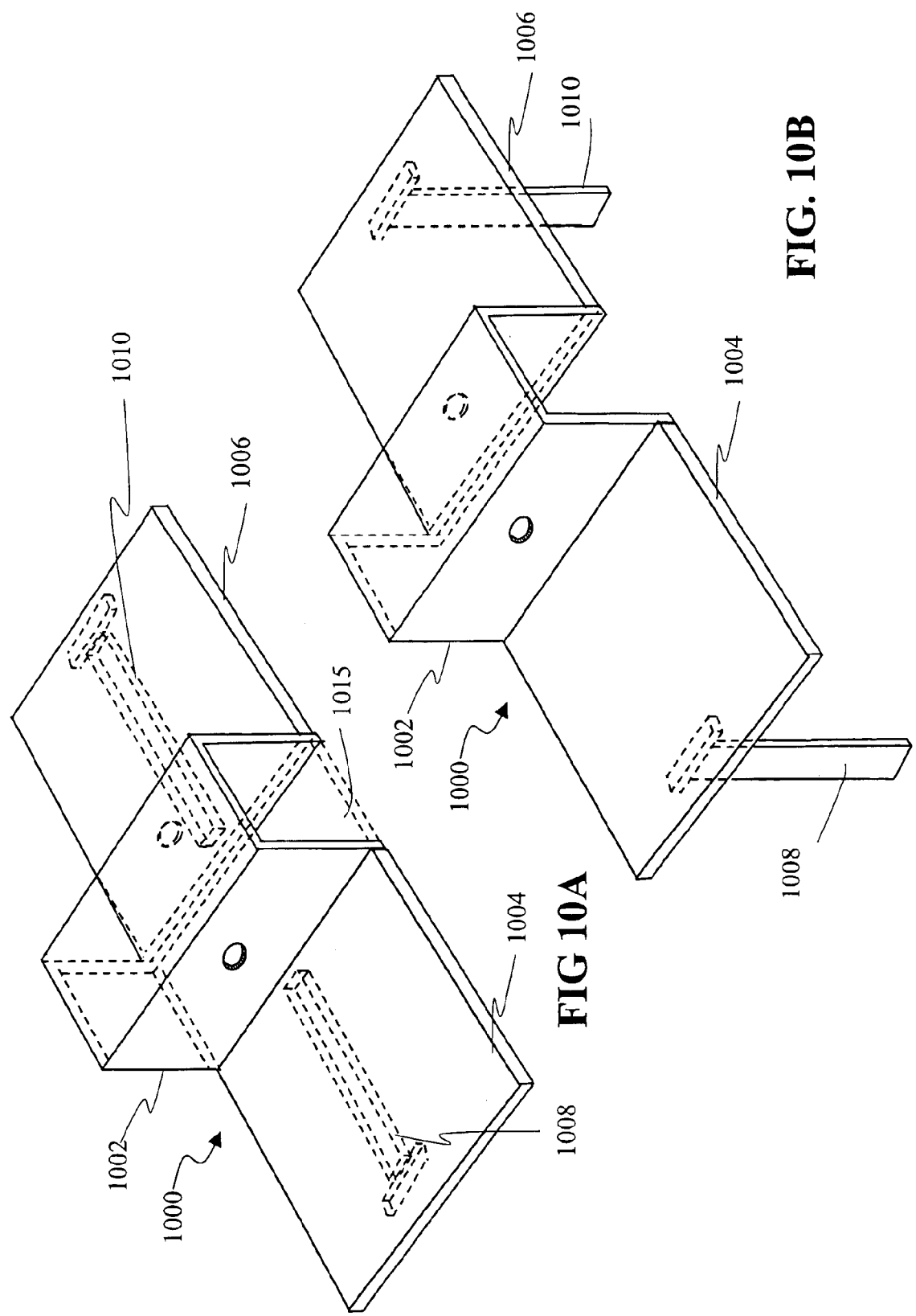

SEAT FOR ATTACHMENT TO A VEHICLE HITCH OR SPORT UTILITY RACK

CROSS REFERENCE TO RELATED APPLICATIONS

This application claims priority from the following U.S. Provisional Patent Application, the disclosure of which, including all appendices and all attached documents, is incorporated by reference in its entirety for all purposes: U.S. Provisional Patent Application Ser. No. 60/380,239, of Wesley Gene Wegner and Alan Conrad Holly entitled, "COLLAPSIBLE SEAT FOR ATTACHMENT TO A TRAILER HITCH OR SPORT UTILITY RACK," filed May 13, 2002.

FIELD OF THE INVENTION

This invention generally relates to a platform for attachment to a vehicle hitch, and more particularly pertains to a readily storable seating assembly, attachable to a vehicle hitch.

BACKGROUND OF THE INVENTION

Sports enthusiasts such as skiers, surfers and bikers often prefer delaying their changing into appropriate sporting attire until their arrival at their particular sporting venue. Changing into appropriate footwear such as biking shoes and skiing boots is especially difficult without a seat. Typical sporting enthusiasts drive trucks or sport utility vehicles that are equipped with receiver hitches and often these hitches receive sport utility racks such as bike and ski racks. For the typical sporting enthusiast, it is desirable to have a utility seat that attaches to either the receiver hitch directly or indirectly by way of a sport utility rack already attached to the receiver hitch or by way of an adaptor. It is further desirable that such a utility seat collapse or fold upward toward the rear of the vehicle when not in use.

The several embodiments of the present invention possess several advantages of this invention over existing platforms in both the stability provided by attaching the sport utility seat to a receiver hitch and the adaptability and versatility such that the seat may be attached inconjunction with a sport utility rack. The several embodiments of the present invention do not require a trunk to be open for attachment and therefore offer a desirable advantage that such embodiments may be folded upward toward the rear of the vehicle for safe traveling.

The several embodiments of the present invention provide a sport utility seat assembly whereby one or more sporting enthusiasts may quickly and conveniently change apparel on a seat that provides stability as a result of its attachment to a receiver hitch or with a sport utility rack with such seat being collapsible such that it may be folded upward toward the rear of the vehicle for safe traveling. Further, the several embodiments provide mounting stations as luggage and cargo carriers and provide platforms for those providing assistance during recreational boat launches from towed trailers.

SUMMARY

A sport utility seat assembly, attachable to a vehicle by way of a receiver hitch, in conjunction with a sport utility rack or, the like, is readily collapsible or otherwise retractable by means of folding or rotating one or more seat panels toward the rear of the vehicle for safe traveling and readily deployable and stable for convenient use.

BRIEF DESCRIPTION OF THE DRAWINGS

The present invention is illustrated by way of example and not limitation in the figures of the accompanying drawings, and in which:

FIG. 1A is the front view of a dual seat assembly of an embodiment of the present invention;

FIG. 1B is a cross section view of the left panel assembly joint of an embodiment of the present invention;

FIG. 1C is the front view of a vehicle hitch/sport utility rack adaptor of an embodiment of the present invention;

FIG. 1D is a cross section view of an embodiment of the vehicle hitch/sport utility rack adaptor;

FIG. 1E is a cross section view of an alternative embodiment of the vehicle hitch/sport utility rack adaptor;

FIG. 9A is a perspective view of a deployed two-piece foldable left panel seat assembly of an alternative embodiment of the present invention;

FIG. 9B is a cross-sectional view of a two-piece foldable left panel seat assembly during the first step of stowing of an alternative embodiment of the present invention;

FIG. 9C is a cross-sectional view of a two-piece foldable left panel seat assembly during the second step of stowing of an alternative embodiment of the present invention;

FIG. 10A is a perspective view of a saddle-shaped embodiment with the support members retracted of an alternative embodiment of the present invention;

FIG. 10B is a perspective view of the saddle-shaped embodiment with the support members extended of an alternative embodiment of the present invention;

DETAILED DESCRIPTION

Figure 2B:
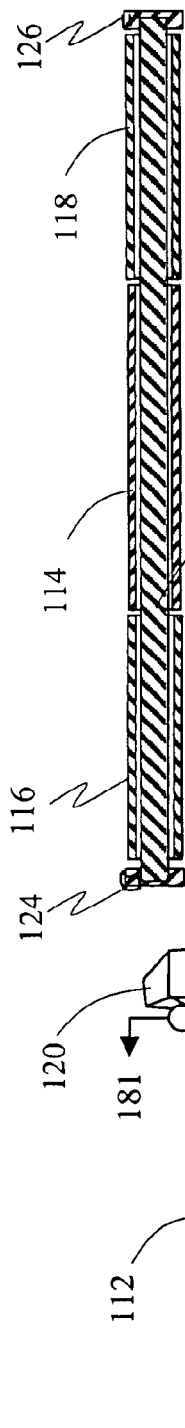
FIG. 2B is a cross section of the hinge line of the left panel assembly of an embodiment of the present invention.

FIG. 1A is the front view (i.e., looking toward the rear of a vehicle for installation) of a dual seat assembly 100 as comprised of a left panel assembly 110 and a right panel assembly 140. The left panel assembly is comprised of a left panel 112 fixedly attached to a first left cylindrical rod housing 114. A second left cylindrical rod housing 116 and a third left cylindrical rod housing 118 are fixedly attached to a left horizontal support member 120. Alternative embodiments of the present invention have hinges selected from the group of hinges providing structural support and needed articulation. The left support member 120 is supported by a fixedly attached strap and mount 122. The left panel 112 and support member 120 are connected in an articulated fashion, preferably a hinge-like fashion, via a cylindrical rod (not shown) placed through the first 114, second 116 and third cylindrical rod housings 118 and held in place by endcaps 124 and 126. The left support member 120 is fixedly attached to a left elevating rod 128. The left elevating rod 128 runs through the elevating rod housing 170. The left elevating member 128, illustrated as a rod, is held in place by a handled threaded blunt screw 130 screwed into the elevating rod housing 170, which in several embodiments is integral with the vehicle hitch shoe 171, in a fashion to allow adjustments in the left elevating member travel position. Alternative embodiments have the vehicle hitch shoe as a sleeve embodiment 174 (FIG. 1E) wherein the sleeve fits over and around a vehicle hitch allowing the insertion of a utility rack having an inserting beam member or other beam member into the vehicle hitch directly. In alternative embodiments, the elevating member includes rectangular transverse shapes and others three or more faces or sides in transverse. In like fashion, the right panel assembly is comprised of a right panel 142 fixedly attached to a first left cylindrical rod housing 144. A second right cylindrical rod housing 146 and a third right cylindrical rod housing 148 are fixedly attached to a right horizontal support member 150. The right support member 150 is supported by a fixedly attached strap and mount 152. The right panel 142 and support member 150 are connected in an articulated fashion via a cylindrical rod (not shown) placed through the first 144, second 146 and third right cylindrical rod housings 148 and held in place by endcaps 154 and 156. The right support member 150 is fixedly attached to a right elevating rod 158. The right elevating member 158 runs through the elevating rod housing 170. The right elevating member 158 is held in place by a handled threaded blunt screw 130 screwed into the elevating rod housing 170 in a fashion to allow adjustments in the right elevating member 158 travel position. The elevating housing 170 is integral to the trailer hitch insert beam or rail 171. Each seat panel 112, 142 may be set at a height relative to the rail and independent of the other seat. Seating pads (not shown) are detachably attachable to each panel.

FIG. 1B is a cross-sectional view 190 of FIG. 1A of the hinge joint at the second left cylindrical rod housing 116 of the left panel assembly 110. In this view, a cylindrical rod 180 is housed by the second left cylindrical rod housing 116, thereby establishing an axis of rotation of the left panel 112 relative to the support member 120. The second left cylindrical rod housing 116 is fixedly attached 117, preferably welded, to the support member 120. The left panel 112, is in proximity to the second left cylindrical rod housing 116

FIG. 1D illustrates a vehicle hitch/sport utility rack adapting member 171 in cross-sectional view 199 of FIG. 1C. A first portion 173 of the adapting member is sized to be insertable into a vehicle hitch. A second portion 172 of the adapting member is sized to receive a second inserting member (not shown) such as the insertable portion of a sport utility rack.

FIG. 1E illustrates a vehicle hitch/sport utility rack adapting member 171 in cross-sectional view 199 of FIG. 1C. The section 174 is a sleeve sized to fit securely around a vehicle hitch receiving member and is also sized to receive an inserting member (not shown) such as the insertable portion of a sport utility rack.

Figure 2A:
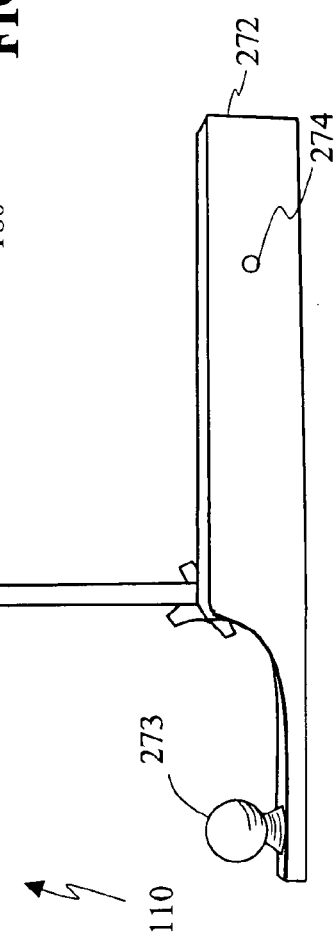
FIG. 2A is a perspective view of the left side of the seat assembly in a deployed position with a ball hitch of an embodiment of the present invention.

FIG. 2A illustrates a side view of a deployed left panel assembly 110 and the trailer hitch shoe 272 with apertures for a securing bolt 274 and ball hitching member 273. The trailer hitch insertion direction is to the right in this illustration.

FIG. 2B is a cross section view 181 of FIG. 2A of the left panel assembly joint illustrating that the left panel 112 and support member 120 are connected in an articulated or otherwise rotational fashion, preferably a hinge-like fashion, via the cylindrical rod 180 placed through the first 114, second 116 and third cylindrical rod housings 118 and held in place by endcaps 124 and 126. Other joints are applicable including hinges.

Figure 3:
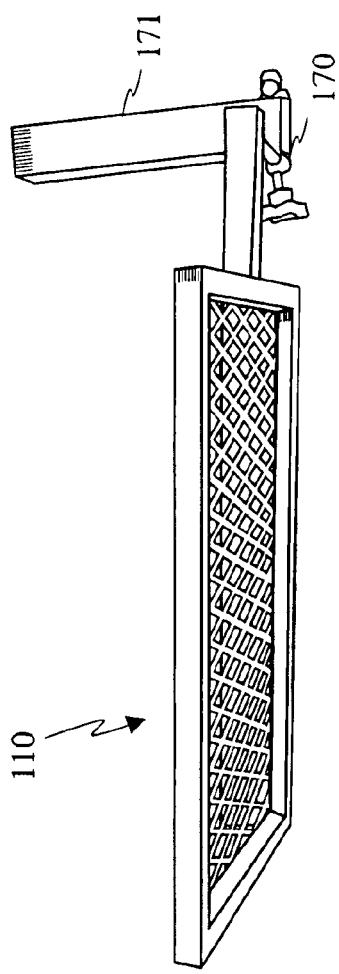
FIG. 3 is a top view of one side of a seat in a retracted or stowed position of an embodiment of the present invention.

FIG. 3 illustrates a top perspective view of a retracted or otherwise stowed left panel assembly 110 and the elevating housing 170 and shoe 171. The trailer hitch insertion direction is to the right in this illustration. When retracted, the panel is secured by a pin and bracket (not shown). A pin receiving first receiving aperture is provided in the panel assembly 110, a bracket having a second receiving aperture aligned to the first aperture is fixedly attached to the support member 120. Alternative securing mechanisms are employable.

Figure 4:
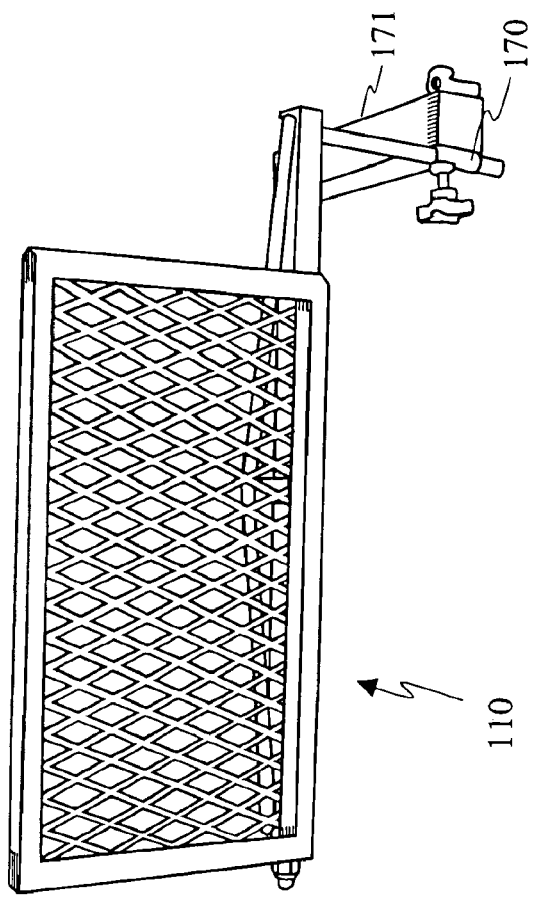
FIG. 4 is a front view of one side of a seat in a retracted or stowed position of an embodiment of the present invention.

FIG. 4 illustrates a perspective view of a retracted or otherwise stowed left panel assembly 110 and the elevating housing 170 and shoe 171. The trailer hitch insertion direction is to the rear in this illustration.

Figure 5:
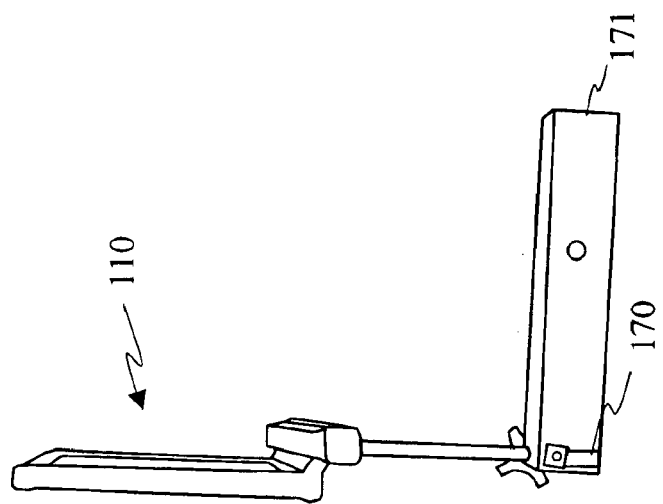
FIG. 5 is a side view of one side of a seat in a retracted position of an embodiment of the present invention.

FIG. 5 illustrates a side perspective view of a retracted or otherwise stowed left panel assembly 110 and the elevating housing 170 and shoe 171. The trailer hitch insertion direction is to the left in this illustration.

Figure 6:
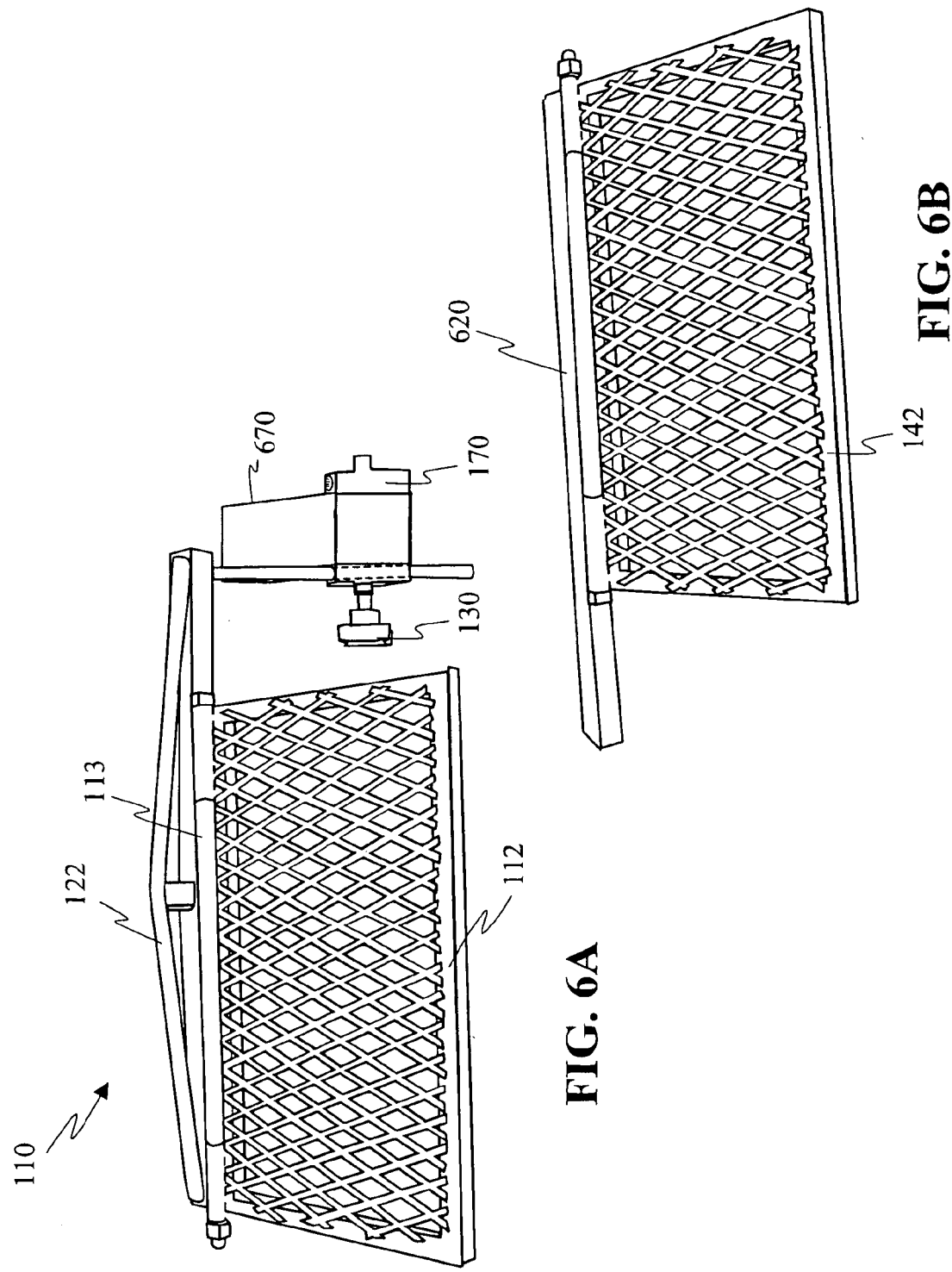
FIG. 6A is a perspective view of a left seat assembly of an embodiment of the present invention.
FIG. 6B is a perspective view of a right seat assembly.

FIG. 6A is a perspective view of the left seat assembly 110 with a support strap 122 attached to the support member 120 showing the elevating housing 170 as integral to a closedend trailer hitch insert beam or rail 670. FIG. 6B is a perspective view of a right panel member 620 with a support member not using the support strap 122.

Figure 7:
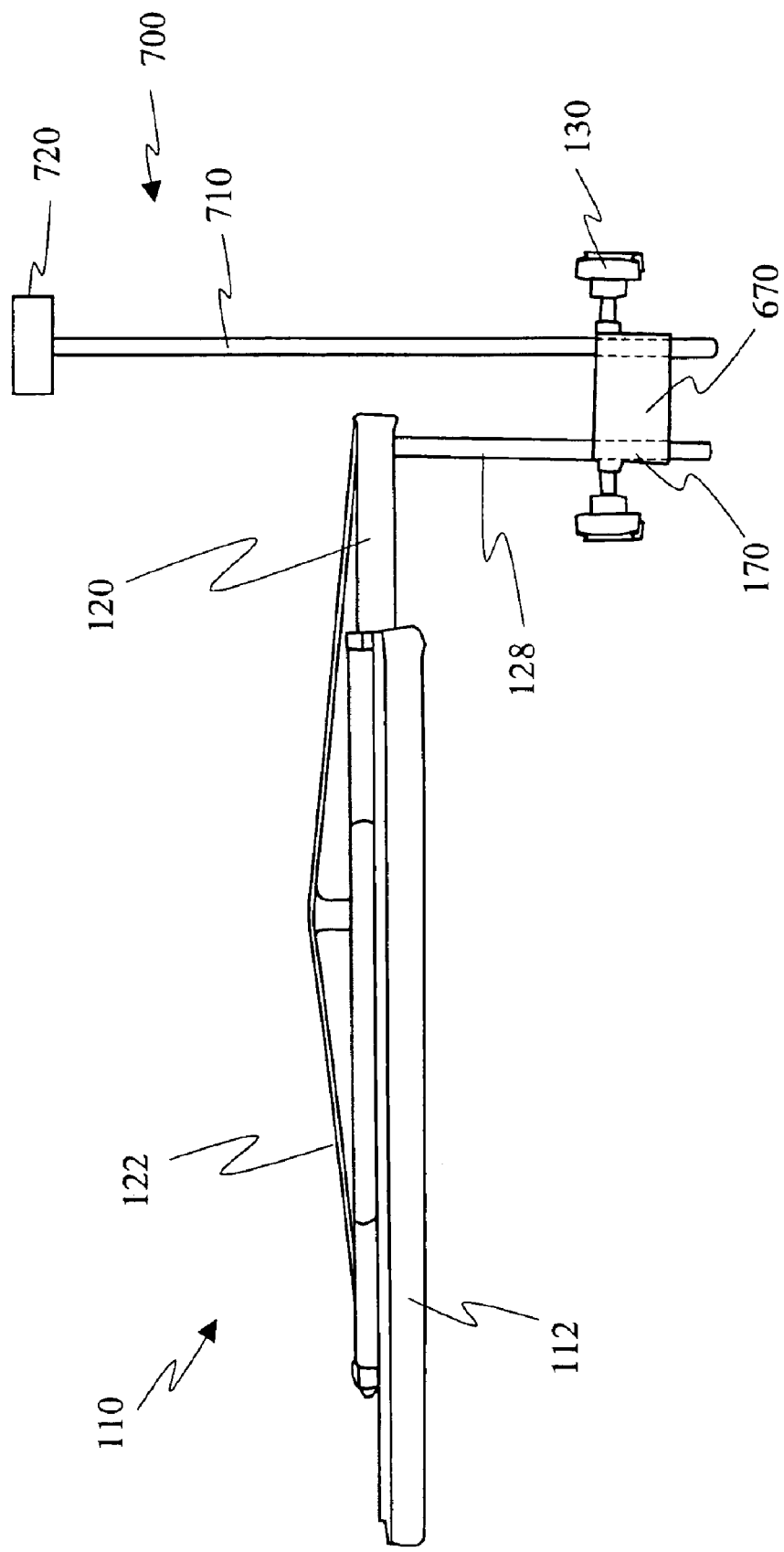
FIG. 7 is a front view of the left side of a seat in a deployed position with a bicycle/ski assembly station on the right side of the hitch beam of an embodiment of the present invention.

FIG. 7 illustrates a front view of a deployed left panel assembly 110, the elevating housing 170 integral to a closed end insertable beam or shoe 670 and a bicycle receiving station assembly 700 in place of a right panel assembly 140 (not shown). The bicycle receiving station assembly 700 is comprised of an elevating rod 710 and a fitment 720 for a bicycle cradle member, a ski clamp/rack member, a ski tuning member of a bike wheel tuning member, or similar members.

Figure 8:
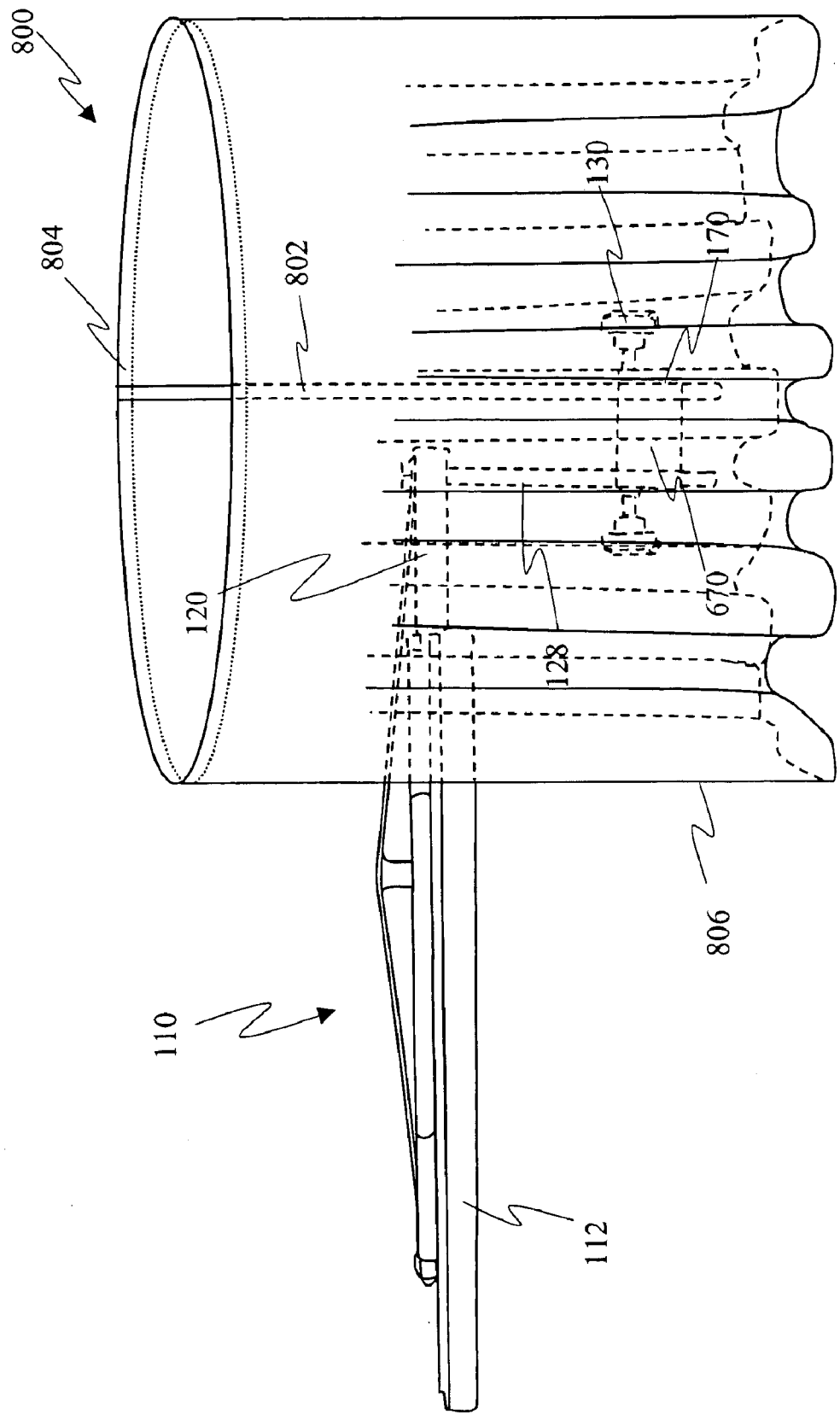
FIG. 8 is a front view of the left side of a seat in a deployed position with a privacy curtain assembly on the right side of the hitch beam of an embodiment of the present invention.

FIG. 8 illustrates a front view of a deployed left panel assembly 110,the elevating housing 170 integral to a closed-end insertable beam or shoe 670 and a privacy curtain assembly 800 in place of a right panel assembly 140 (not shown). The privacy curtain assembly 800 is comprised of an elevating rod 802, a structural ring member 804 fixedly attached to the elevating rod 802 and a privacy curtain 806.

FIG. 9A illustrates a perspective view of a deployed left panel assembly 110 where in the embodiments such as this one, the left panel is comprised of a first left subpanel 902, a second left subpanel 904 and a hinge system comprised of a first left cylindrical housing 906. The hinge system is preferably substantially similar to that of the left support member 120 and the left panel 112 as disclosed in FIG. 2A. FIG. 9B illustrates a first step in stowage by a transverse cut side view 920 of FIG. 9A with the second left subpanel 904 being folded upon the first left subpanel 902 about the axis of rotation provided by the hinge system comprised of first left cylindrical housing 906 and a second cylindrical rod 910. FIG. 9C illustrates a second step in stowage by a transverse cut side view 920 of FIG. 9A with the first left subpanel 902 being rotated upward and about the cylindrical rod 180.

FIG. 10A is a perspective view of a saddle-shaped embodiment 1000 of the present invention. The present example of a saddle-shaped embodiment is comprised of a left seat panel 1004 and a right seat panel 1006 and a three-sided connecting member 1002 shaped to straddle a trailer hitch beam extension (not shown). An alternative embodiment has the connecting member 1002 with a fourth side 1015. The underside of the left seat panel has a deployable leg 1008 and the underside of the right seat panel has a deployable leg 1010. FIG. 10B is a perspective view of the saddle shaped embodiment with the legs 1008, 1010 deployed.

Figure 11:
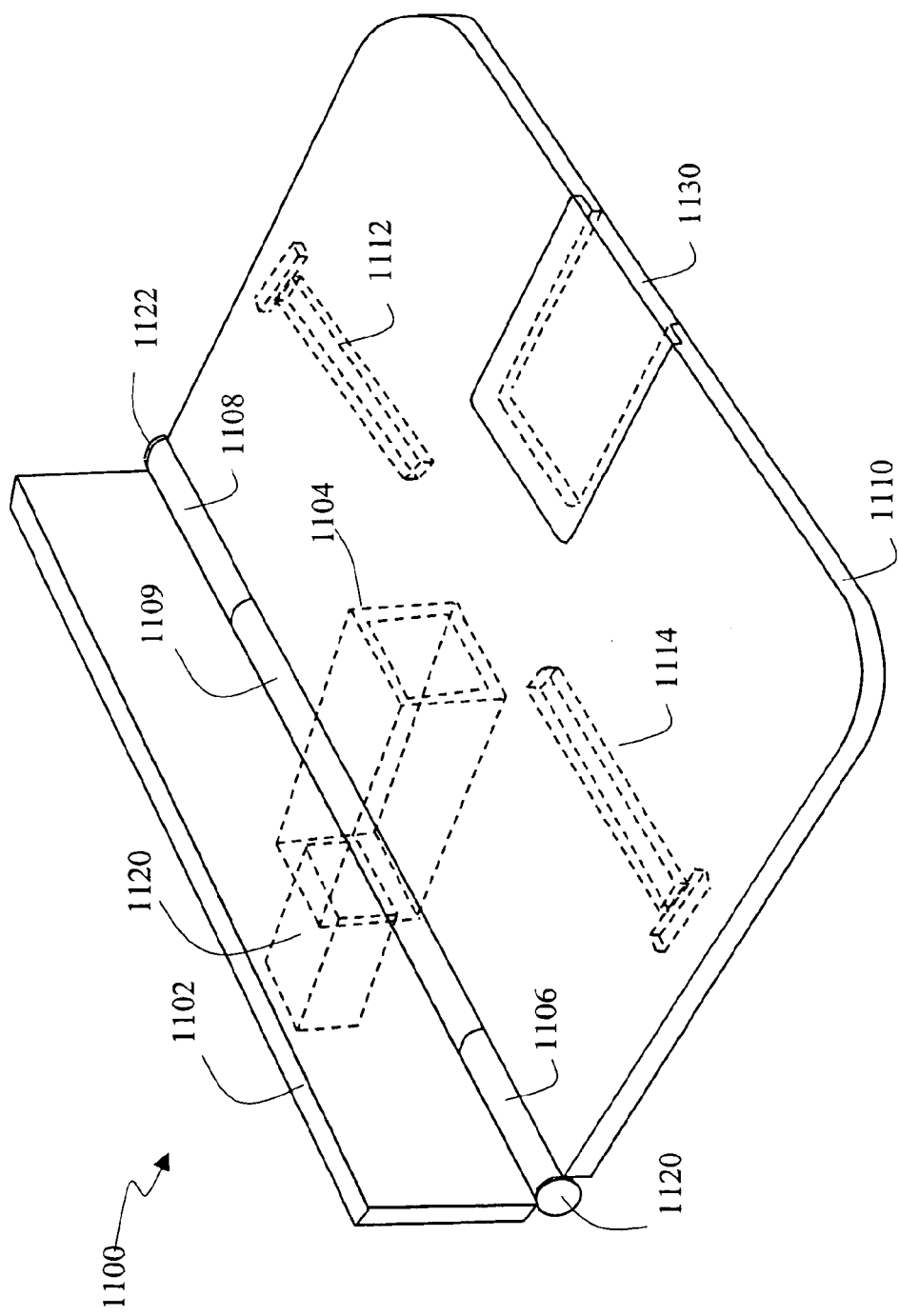
FIG. 11 is a perspective view of an embodiment illustrating a single panel bench with an insertion channel and removable panel for the addition of a sport utility rack of an alternative embodiment of the present invention.

FIG. 11 is a perspective view of an embodiment of the present invention illustrating the insertion channel for a sport utility rack such as a bike or ski rack with a hinged panel deployed 1110. An alternative embodiment has a fixed panel (i.e., without hinged articulation). The seat assembly 1100 is comprised of a vertical member 1102 fixedly attached to a rail adaptor 1104 similar in function as the adapting member 171 illustrated in FIG. 3. A first cylindrical rod housing 1106 and a second cylindrical rod housing 1108 are fixedly attached to the vertical member 1102. A third cylindrical rod housing 1109 is fixedly attached to a seat panel 1110. The seat panel 1110 and vertical member 1102 are connected in an articulated fashion, preferably a hinge-like joint, via a cylindrical rod (not shown), or other suitable hinge mechanism similar in function to the cylindrical rod 180 described in FIGS. 1B, 2B and 9C, placed through the first 1106, second 1108 and third cylindrical rod housings 1109 and held in place by endcaps 1120 and 1122. A right support member 1112 and a left support member 1114 are stowed on the underside of the seat panel 1110 and are deployable to augment seat panel stability in a manner similar to the support members 1008, 1010 illustrated in FIG. 10B. The male adaptor portion 1120 of the rail adaptor 1104 is insertable into a vehicle hitch (not shown). Alternative embodiments include a male adaptor member separate and detachably attachable to the rail adaptor 1104. The male adaptor portion 1120 is insertable into a trailer hitch leaving the rail adaptor 1104 without sufficient volume to receive additional rail attachments such as bicycle rack. Accordingly, the seat assembly described is usable either independently or in conjunction with a sport utility rack such as a bike or ski rack and is attached via a trailer hitch unit. An alternative embodiment has a rail adapter 1104 without a vertical member 1102 of the previously described embodiment, thereby acting as a sleeve fitting securely over a vehicle hitch receiving member and allowing for a rack mounting member to be inserted through the sleeve 1104 and into the vehicle hitch receiving member (not shown). For those sport utility rack members that angle upwards a short distance from their attaching means, FIG. 11 illustrates a removable seat panel section 1130.

Figure 12B:
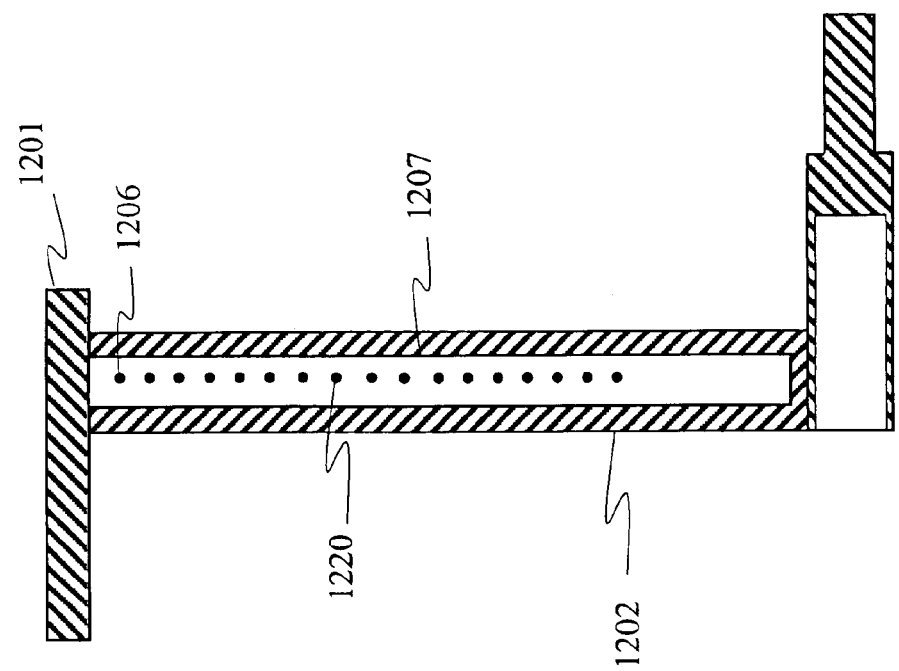
FIG. 12B is a front cross-sectional view of a spring-loaded pin elevating mechanism of an alternative embodiment of the present invention.
Figure 12A:
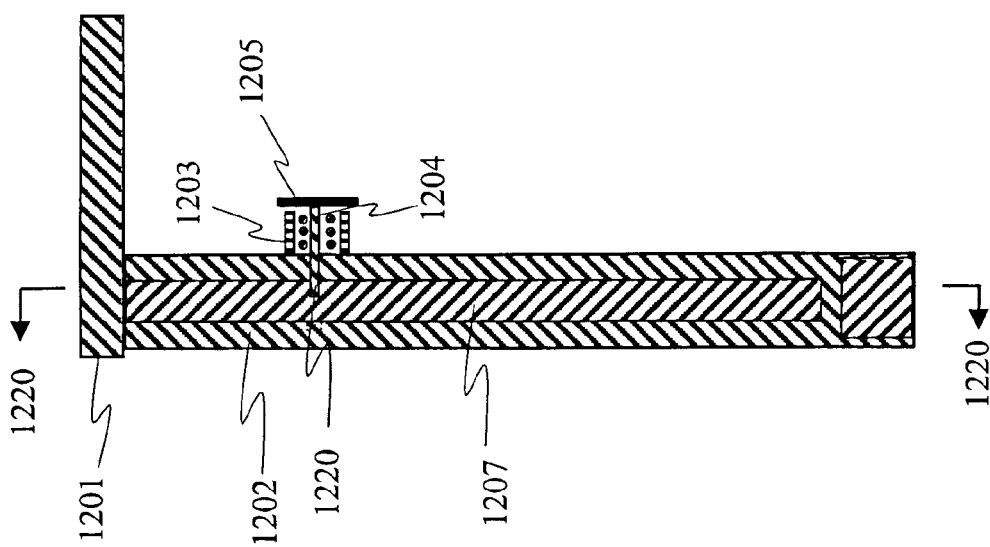
FIG. 12A is a side cross-sectional view of a spring-loaded pin elevating mechanism for a right panel assembly of an alternative embodiment of the present invention.

In all embodiments, the seat assembly utilizes the standard trailer hitch attaching devices for safety. The one or more support planes of the seat assembly are intended, as shown in the several embodiments, to be raised and/or lowered to allow for different leg lengths. This may be accomplished in a number of ways. The means of deployed seat elevation of several embodiments include: a rod perpendicular to the hitch mount (as shown in FIG. 1A); a ratchet-type mechanism; a sliding bar, attached to the base, permitting sliding along the bottom of the seat; or a removable pin (as shown in FIGS. 12A and 12B below), A panel or assembly elevation method embodiment of the present invention uses a cylindrical member and a screw, as illustrated in FIG. 1A as the left elevating rod 128, and a screw such as handled threaded blunt screw 130. FIG. 12A illustrates a transverse cut view of an alternative elevating embodiment of the present invention where a seat panel 1201 is fixed attached to an elevating member or beam 1207. The elevating beam 1207 travels vertically within a housing 1202. A spring mechanism 1203 is fixedly attached to the housing 1202 and pin 1204 with a knob 1205 in a fashion unloading the spring mechanism 1203 wherein the pin 1204 travels within an aperture 1220 of the housing 1202. The elevating beam 1207 has at least one aperture that receives the pin 1204. The travel of the pin 1204 is such that its withdrawal from the elevating beam 1207 loads the spring mechanism 1203. A transverse cut of FIG. 12A at 1220 is illustrated in FIG. 12B where a plurality of apertures 1220 are shown. By this means, the elevating beam 1207 has several elevational settings, one at each aperture 1220 and the setting is resettable via the spring-load pin 1204.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims.

The words used in this specification to describe the several embodiments of the present invention are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include that which is specifically illustrated and described above; that which is conceptually equivalent, that which can be obviously substituted and that which incorporates the essential idea of the invention as disclosed by its several embodiments.

We claim:

1. A folding seat assembly for use in combination with a vehicle hitch receiver of a vehicle, the folding seat assembly comprising:
   (a) a mounting member, mountable to the vehicle hitch receiver, having a first elevating member housing;
   (b) a first elevating member, adjustably attached to the mounting member at the first elevating member housing; and
   (c) a first section comprising:
      a first structural member attached to and cantilevered from the first elevating member; and
      a first seat rotatably attached to the first structural member on a side of the first seat in proximity to the vehicle, wherein the first seat projects in one direction from the first structural member; wherein the first seat is substantially horizontal when deployed and substantially vertical when retracted; and wherein the first seat is adjustable in height relative to the mounting member.

2. The folding seat assembly as claimed in claim 1 wherein the mounting member is an adapting member having a first portion adapted to be inserted into the vehicle hitch receiver and having a second portion adapted to receive a rack insertion member.

3. The folding seat assembly as claimed in claim 2 wherein the mounting member, mountable to the vehicle hitch receiver is a shoe insertable into the vehicle hitch.

4. The folding seat assembly as claimed in claim 3 wherein the mounting member has a ball hitching member.

5. A folding seat assembly as claimed in claim 2 wherein the mounting member, mountable to the vehicle hitch receiver is a sleeve mountable about the vehicle hitch receiver.

6. A folding seat assembly as claimed in claim 1 wherein the mounting member, mountable to the vehicle hitch receiver, further comprises a second elevating member housing adapted to receive a second elevating member.

7. The folding seat assembly as claimed in claim 6 further comprising:
   the mounting member having a second elevating member housing;
   the second elevating member, adjustably attached to the mounting member at the second elevating member housing; and
   a second section comprising:
      a second structural member attached to and cantilevered from the second elevating member, horizontal and opposite the first structural member direction of extension; and
      a second seat rotatable attached to the second structural member on a side of the second seat in proximity to the vehicle, wherein the second seat projects in one direction from the first structural member; wherein the second seat is substantially horizontal when deployed and substantially vertical when retracted; and wherein the second seat is adjustable in height relative to the mounting member.

* * * * *